US010933377B2

(12) United States Patent
Briggs et al.

(10) Patent No.: US 10,933,377 B2
(45) Date of Patent: Mar. 2, 2021

(54) APPARATUS AND APPARATUS ASSEMBLY

(71) Applicant: Aquafortus Technologies Limited, Auckland (NZ)

(72) Inventors: Daryl Joseph Briggs, Auckland (NZ); Samrith Kim, Auckland (NZ)

(73) Assignee: Aquafortus Technologies Limited, Auckland (NZ)

( * ) Notice: Subject to any disclaimer, the term of this patent is extended or adjusted under 35 U.S.C. 154(b) by 122 days.

(21) Appl. No.: 16/145,968

(22) Filed: Sep. 28, 2018

(65) Prior Publication Data

US 2019/0099718 A1 Apr. 4, 2019

Related U.S. Application Data

(60) Provisional application No. 62/565,311, filed on Sep. 29, 2017.

(51) Int. Cl.
| | |
|---|---|
| *B01D 69/10* | (2006.01) |
| *B01D 65/10* | (2006.01) |
| *B01D 61/28* | (2006.01) |
| *B01D 61/18* | (2006.01) |
| *B01D 33/01* | (2006.01) |

(Continued)

(52) U.S. Cl.
CPC .......... *B01D 61/18* (2013.01); *B01D 33/01* (2013.01); *B01D 33/015* (2013.01); *B01D 33/0183* (2013.01); *B01D 61/08* (2013.01); *B01D 61/28* (2013.01); *B01D 65/10* (2013.01); *B01D 69/12* (2013.01); *C02F 1/44* (2013.01); *C02F 1/441* (2013.01); *C02F 1/444* (2013.01); *C02F 1/445* (2013.01); *B01D 33/00* (2013.01); *B01D 61/002* (2013.01); *B01D 65/102* (2013.01); *B01D 65/104* (2013.01); *B01D 69/10* (2013.01); *B01D 2313/025* (2013.01); *B01D 2313/14* (2013.01); *B01D 2313/21* (2013.01); *B01D 2313/24* (2013.01); *B01D 2315/04* (2013.01); *B01D 2315/05* (2013.01); *B01D 2315/10* (2013.01); *B01D 2315/16* (2013.01); *C02F 2301/022* (2013.01); *G01N 15/0826* (2013.01)

(58) Field of Classification Search
CPC ........... G01N 15/0826; B01D 33/0183; B01D 33/015; B01D 33/01; B01D 61/08; B01D 61/28; B01D 33/00; B01D 2313/14; B01D 2313/025; B01D 2315/05; B01D 2315/04; B01D 2315/16; B01D 2315/10; B01D 2313/24; B01D 69/10; B01D 65/104; B01D 61/18; B01D 65/10; B01D 69/12; B01D 65/102; B01D 61/002; B01D 2313/21; C02F 1/445; C02F 1/441; C02F 1/444; C02F 1/44; C02F 2301/022
See application file for complete search history.

(56) References Cited

U.S. PATENT DOCUMENTS 4,789,482 A * 12/1988 DiLeo ................. B01D 61/145
210/195.2

* cited by examiner

*Primary Examiner* — Angel Olivera
(74) *Attorney, Agent, or Firm* — Nelson Mullins Riley & Scarborough LLP; Jane E. Remillard, Esq.; Cynthia L. Kanik

(57) ABSTRACT

The present disclosure relates to an apparatus and an apparatus assembly for assessing the suitability of a membrane, such as an osmotic membrane in an osmotic process. Furthermore, the apparatus, and apparatus assembly provide the means to optimise the parameters of an osmotic process, including the ability to gather key data for different membrane based osmotic systems to enable osmotic process and system optimisation.

16 Claims, 10 Drawing Sheets

(51) Int. Cl.
*B01D 33/00* (2006.01)
*C02F 1/44* (2006.01)
*B01D 69/12* (2006.01)
*B01D 61/08* (2006.01)
*G01N 15/08* (2006.01)
*B01D 61/00* (2006.01)

Figure 7 Flux Experiment Schematic

APPARATUS AND APPARATUS ASSEMBLY

FIELD OF THE INVENTION

The present disclosure relates to an apparatus and an apparatus assembly for assessing the suitability of a membrane, such as an osmotic membrane in an osmotic process. Furthermore, the apparatus, and apparatus assembly provide the means to optimise the parameters of an osmotic process, including the ability to gather key data for different membrane based osmotic systems to enable osmotic process and system optimisation.

BACKGROUND OF THE INVENTION

There are many osmotic membranes available for purchase. The performance of these membranes is often difficult to gauge at the outset of an osmotic plant project given that there are so many variables that can affect the performance of any osmotic process, including flux rates, pressure drops, temperature differentials, cross-flow velocities, mass balance and the like. It would be near on impossible to have a detailed sense of how a membrane would perform without building a small scale prototype of the plant and trying to simulate the anticipated parameters of the plant.

Sterlitech Corporation has developed a SEPA CF-FO cell. The Sepa CF-FO Forward Osmosis system provides lab scale filtration that efficiently simulates the flow dynamics of much larger membrane elements.

Despite the Sterlitech system, there are some deficiencies in what is offered in the Sterlitech system. These include the inability to accurately adjust the spacing around the membrane, the penetrations that are required to the membrane to position the membrane and the lack of an embedded constant-temperature-anemometer for measuring cross flow velocity. It is therefore an object of the present invention to provide an apparatus that overcomes these difficulties or to at least provide a useful alternative.

SUMMARY OF THE INVENTION

In a first aspect the present invention provides a cell suitable for use in membrane assessment, the apparatus comprising:
 a) a housing that provides a base supporting an adjustable piston system,
 b) the piston system, in use being able to adjust the height of a membrane support surface relative to the base plate of the housing by piston adjustment means,
 c) the membrane being locatable on the membrane support surface, and
 d) a constant temperature anemometer being located on the membrane support surface, which in use measures the cross-flow velocity of a fluid flowing on one side of the membrane, and
 e) one or more laminar input flow channels that in use direct a fluid across one side of the membrane and
 f) one or more laminar output flow channels that in use collect the fluid that has passed across the membrane.

In a second aspect, the present invention provides an apparatus assembly that comprises two cells as defined above, coupled together and separated by one membrane, wherein in use, one cell is dedicated to a first fluid on one side of the membrane and the other cell is dedicated to a second fluid on the other side of the membrane.

In a further aspect of the present invention, there is a provided an apparatus kit that comprises:
 a) an apparatus assembly as defined above,
 b) a mass balance,
 c) a pump,
 d) an inline chiller; and an
 e) Inline heater,
wherein in use, the kit elements are connected in a circuit with the mass balance connected to the pump, the pump is connected to the inline chiller, which inline chiller is connected to the inline heater, which inline heater is connected to the apparatus assembly and which apparatus assembly is connected to the mass balance for use in assessing the performance of a membrane with the apparatus assembly.

The foregoing brief summary broadly describes the features and technical advantages of certain embodiments of the present invention. Further technical advantages will be described in the detailed description of the invention and figures that follow.

Novel features that are believed to be characteristic of the invention will be better understood from the detailed description of the invention when considered in connection with any accompanying figures and examples. However, the figures and examples provided herein are intended to help illustrate the invention or assist with developing an understanding of the invention, and are not intended to limit the invention's scope.

DETAILED DESCRIPTION OF THE INVENTION

The following description sets forth numerous exemplary configurations, parameters, and the like. It should be recognised, however, that such description is not intended as a limitation on the scope of the present invention, but is instead provided as a description of exemplary embodiments.

Definitions

In each instance herein, in descriptions, embodiments, and figures of the present invention, the terms "comprising", "including", etc., are to be read expansively, without limitation. Thus, unless the context clearly requires otherwise, throughout the description and the claims, the words "comprise", "comprising", and the like are to be construed in an inclusive sense as to opposed to an exclusive sense, that is to say in the sense of "including but not limited to".

The term "about" or "approximately" usually means within 20%, more preferably within 10%, and most preferably still within 5% of a given value or range. Alternatively, the term "about" means within a log (i.e., an order of magnitude) preferably within a factor of two of a given value.

The figures shown and described herein are provided for the purpose of illustrating specific embodiments of the invention and are not intended to limit the invention in any way. Persons of ordinary skill can utilise the disclosures and teachings herein to produce other embodiments and variations without undue experimentation. All such embodiments and variations are considered to be part of this invention.

Figure 1A:
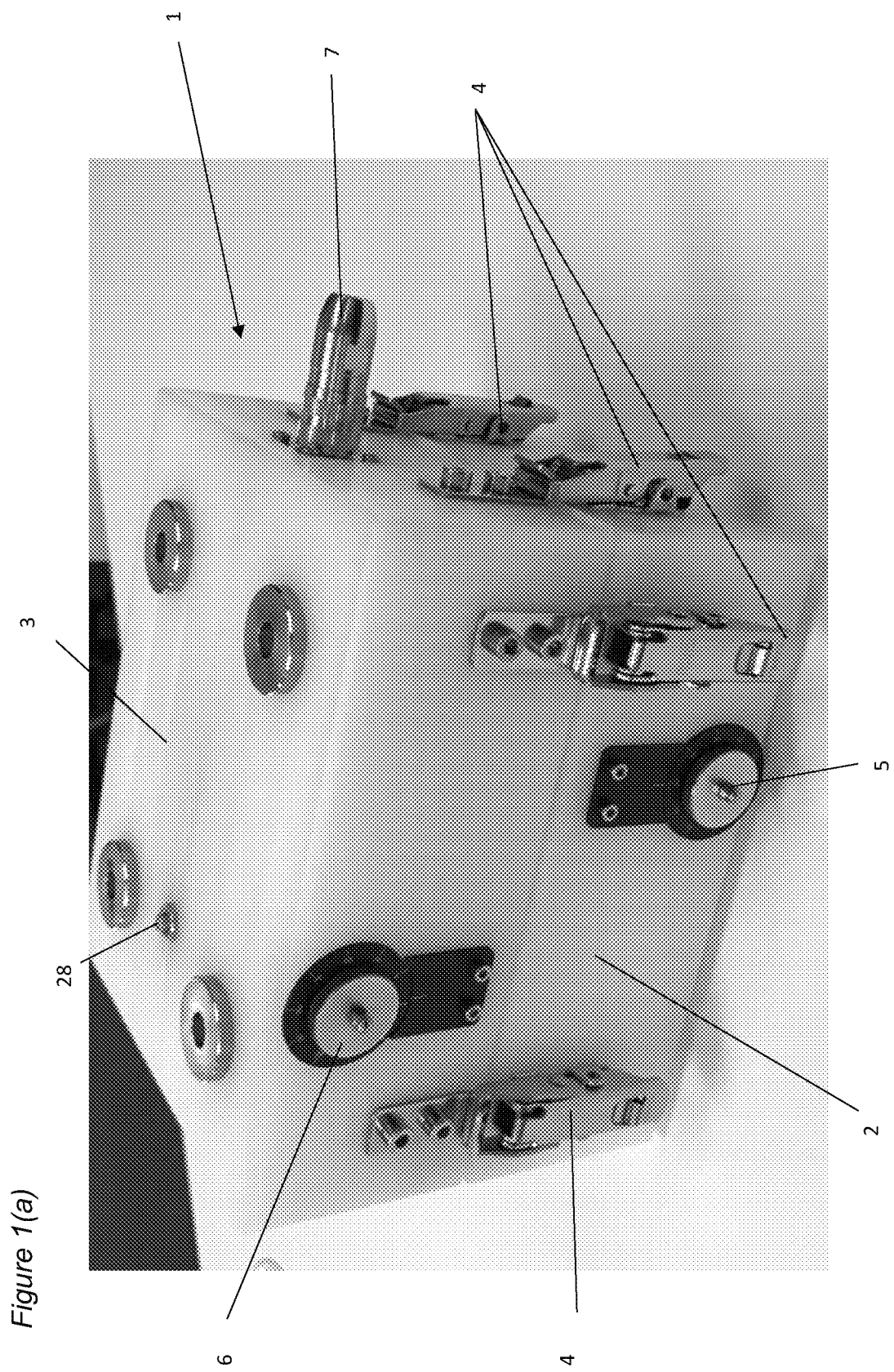
FIG. 1(a) shows a photo of a perspective view of one side of an apparatus assembly of the invention.
Figure 1B:
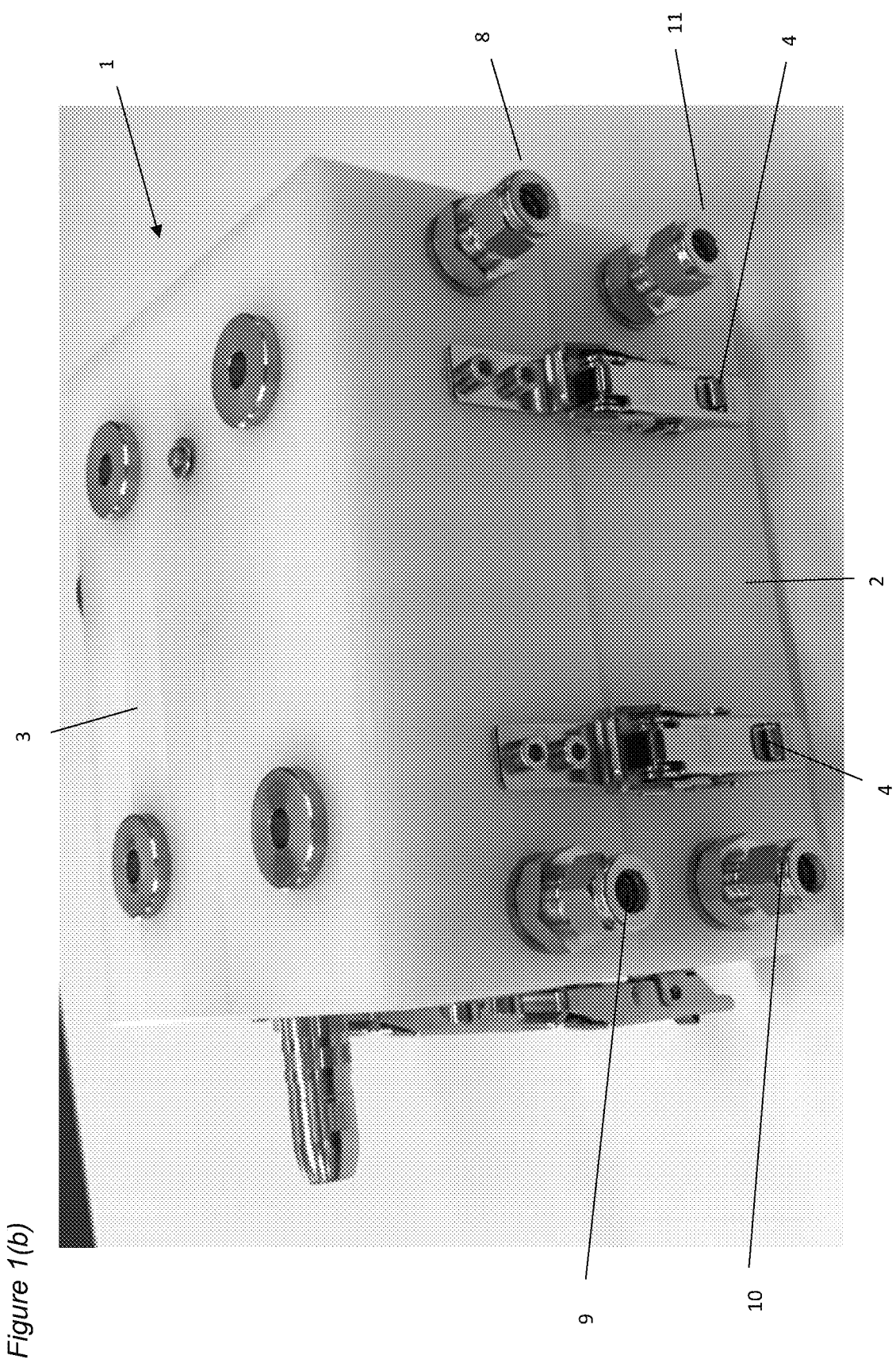
FIG. 1(b) shows a photo of a perspective view of the opposite side of an apparatus assembly of the invention shown in FIG. 1(a).
Figure 2:
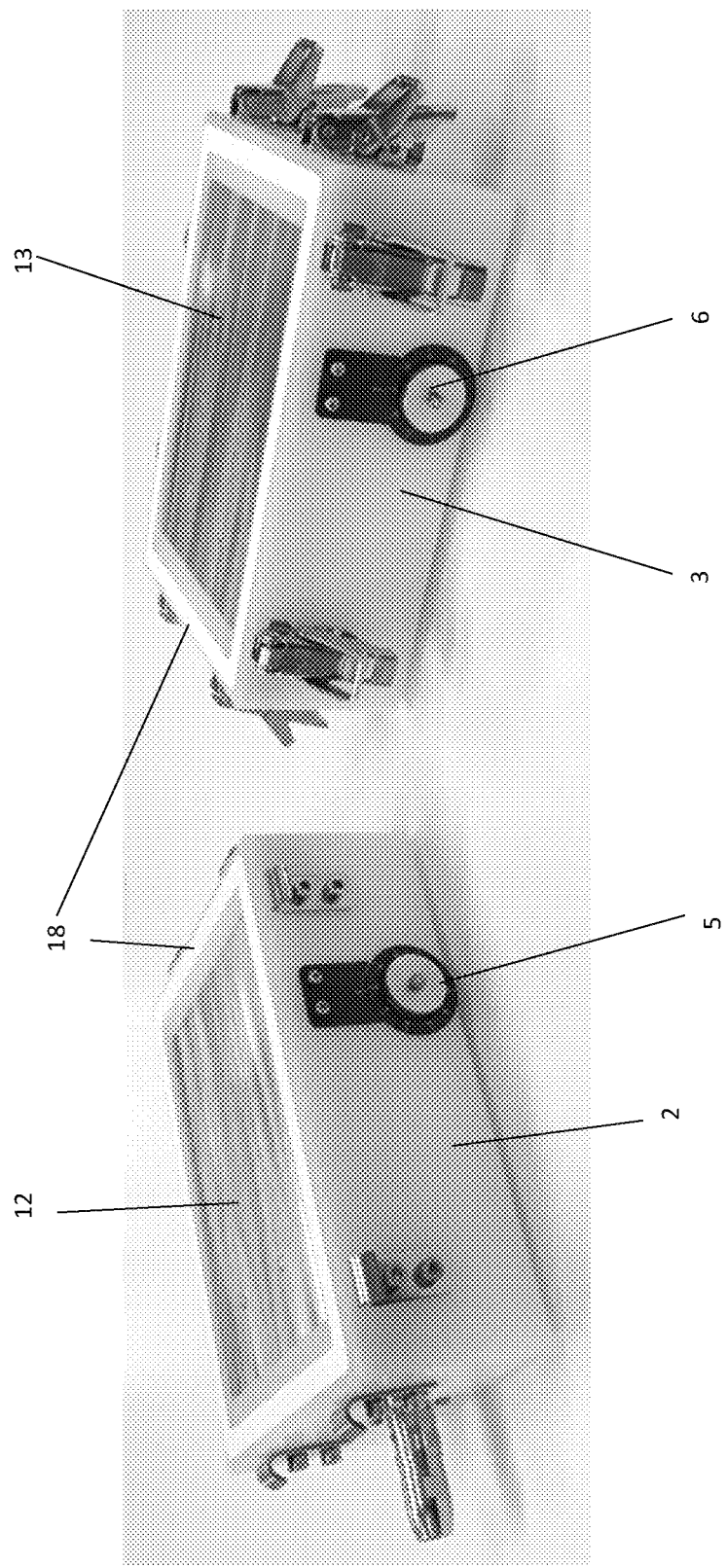
FIG. 2 shows a photo of one side of two cells of the invention.
Figure 3:
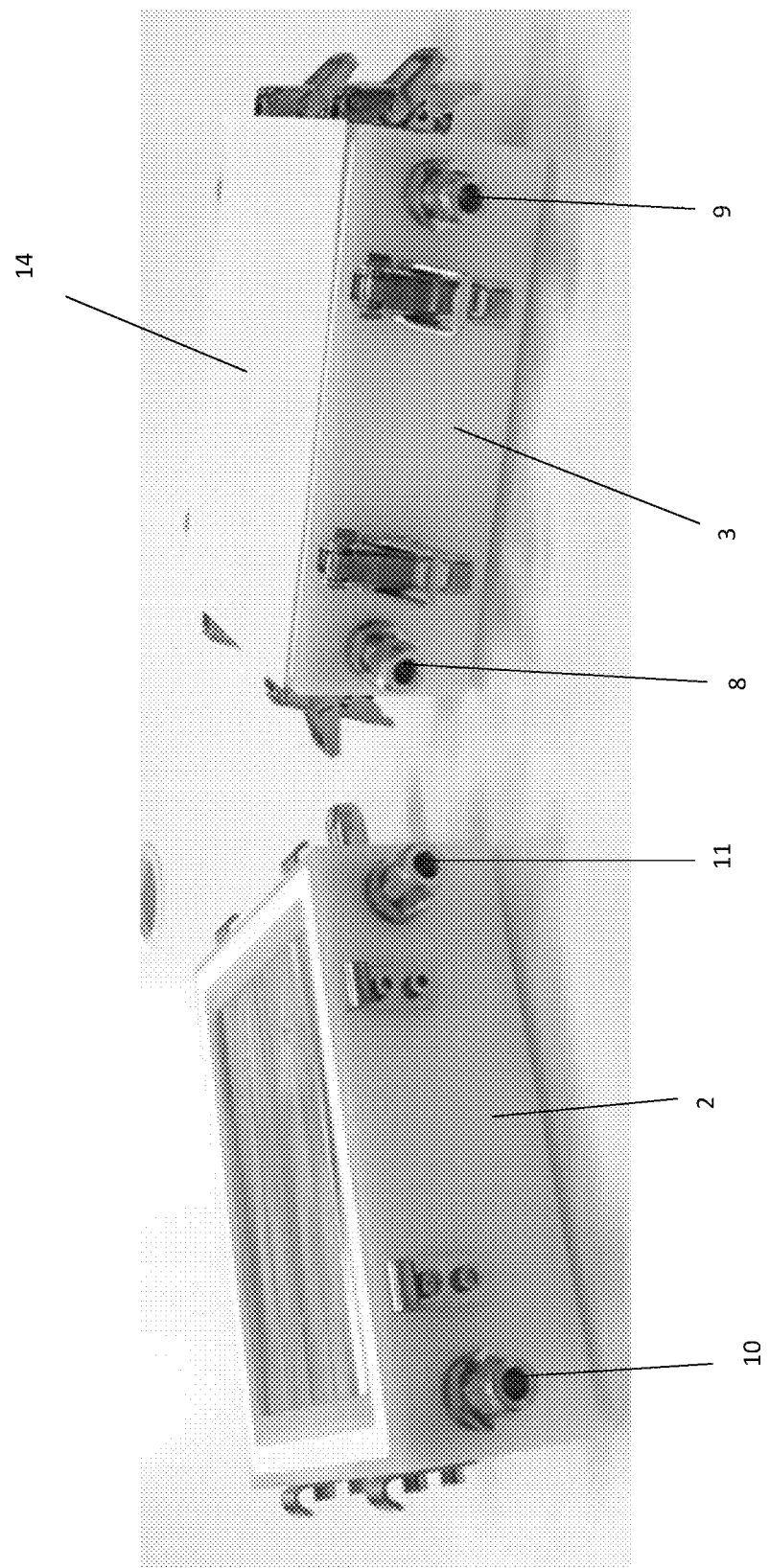
FIG. 3 shows a photo of the opposing side of two cells of the invention shown in FIG. 2 and with the location of the membrane being shown on top of the right hand cell.
Figure 4:
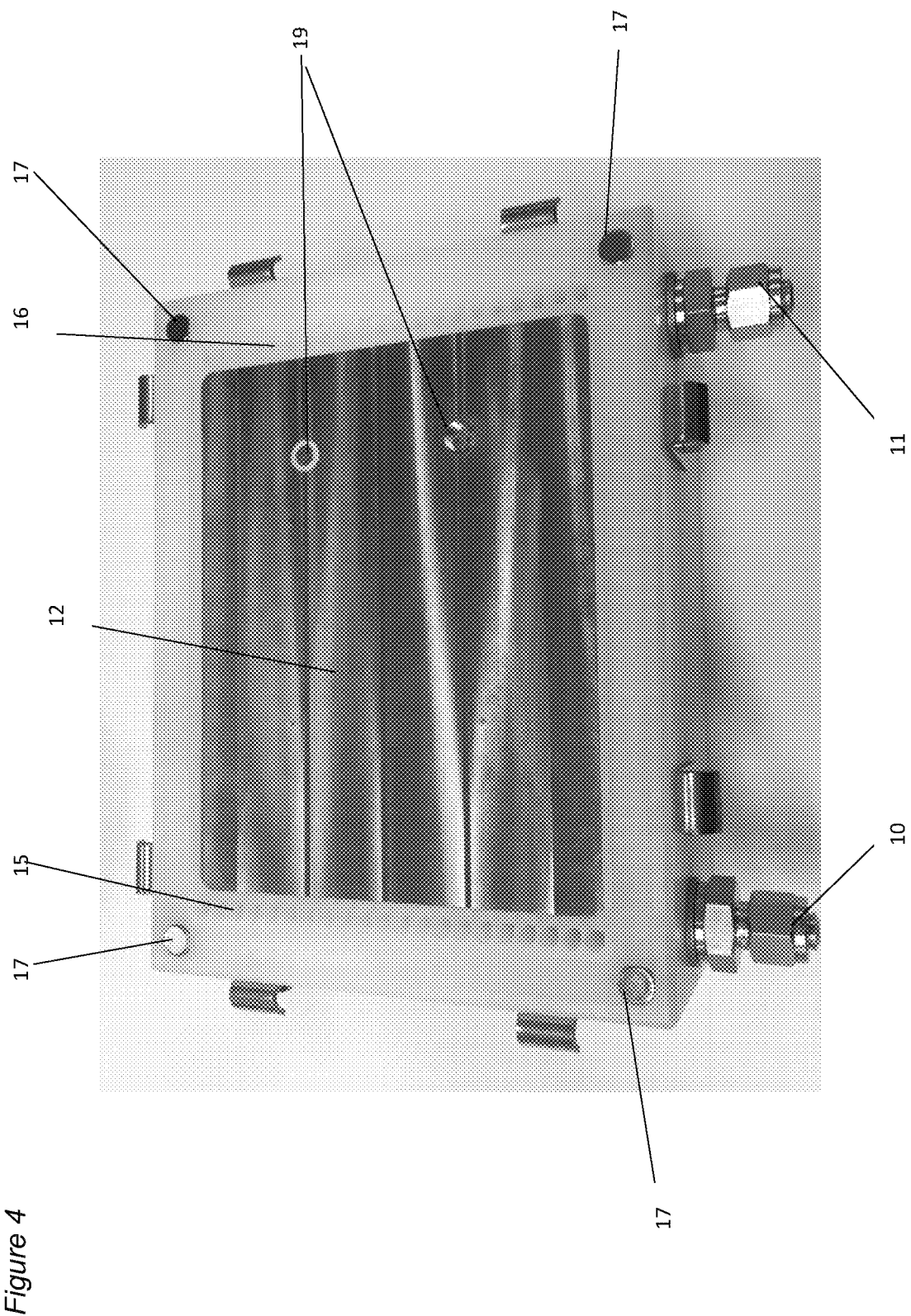
FIG. 4 shows a photo of a top view of a cell of the invention.
Figure 5:
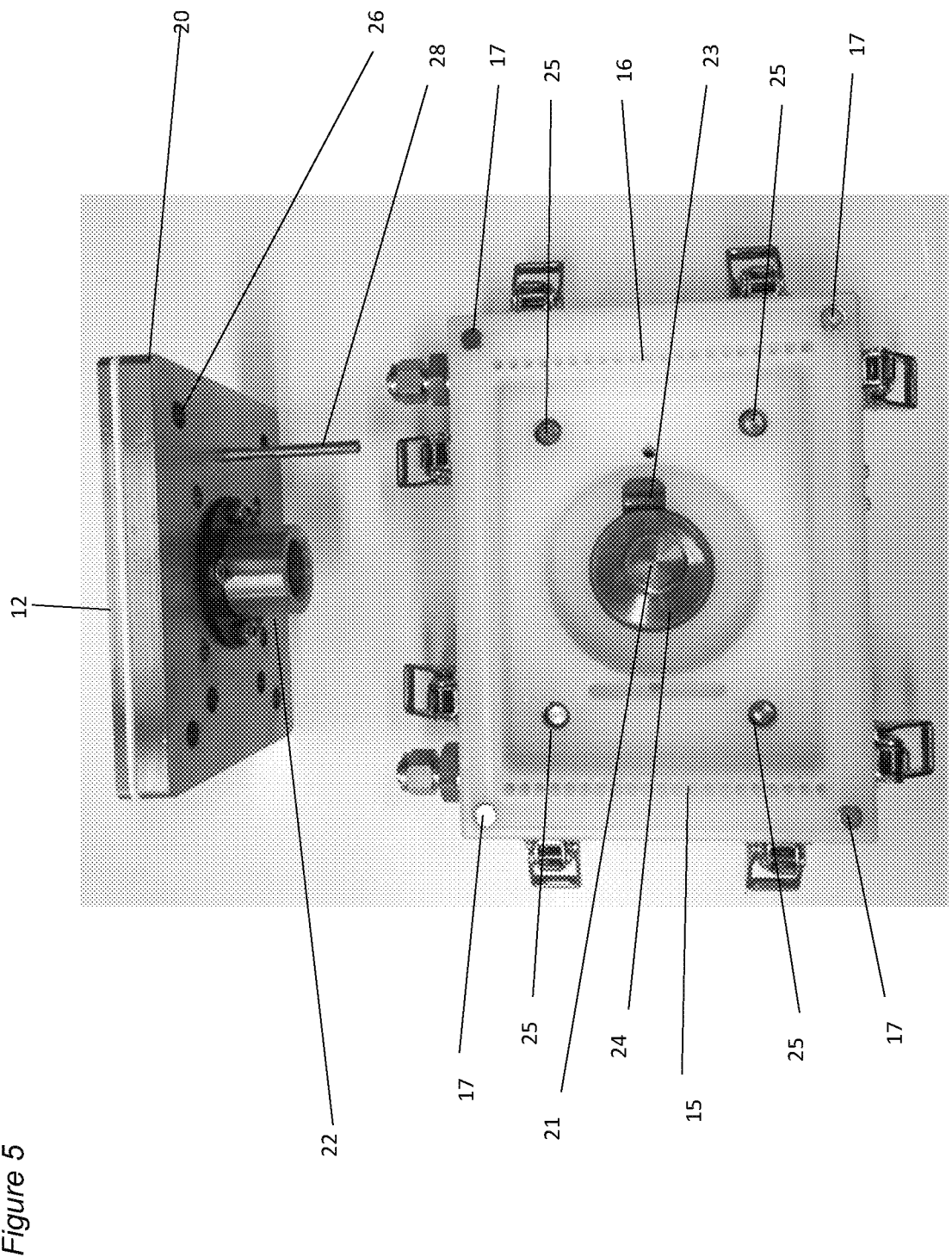
FIG. 5 shows a photo of a top view of the interior of the housing of a cell of the present invention and a side view of the membrane support that sits above the piston adjustment mechanism within the cell housing.
Figure 6:
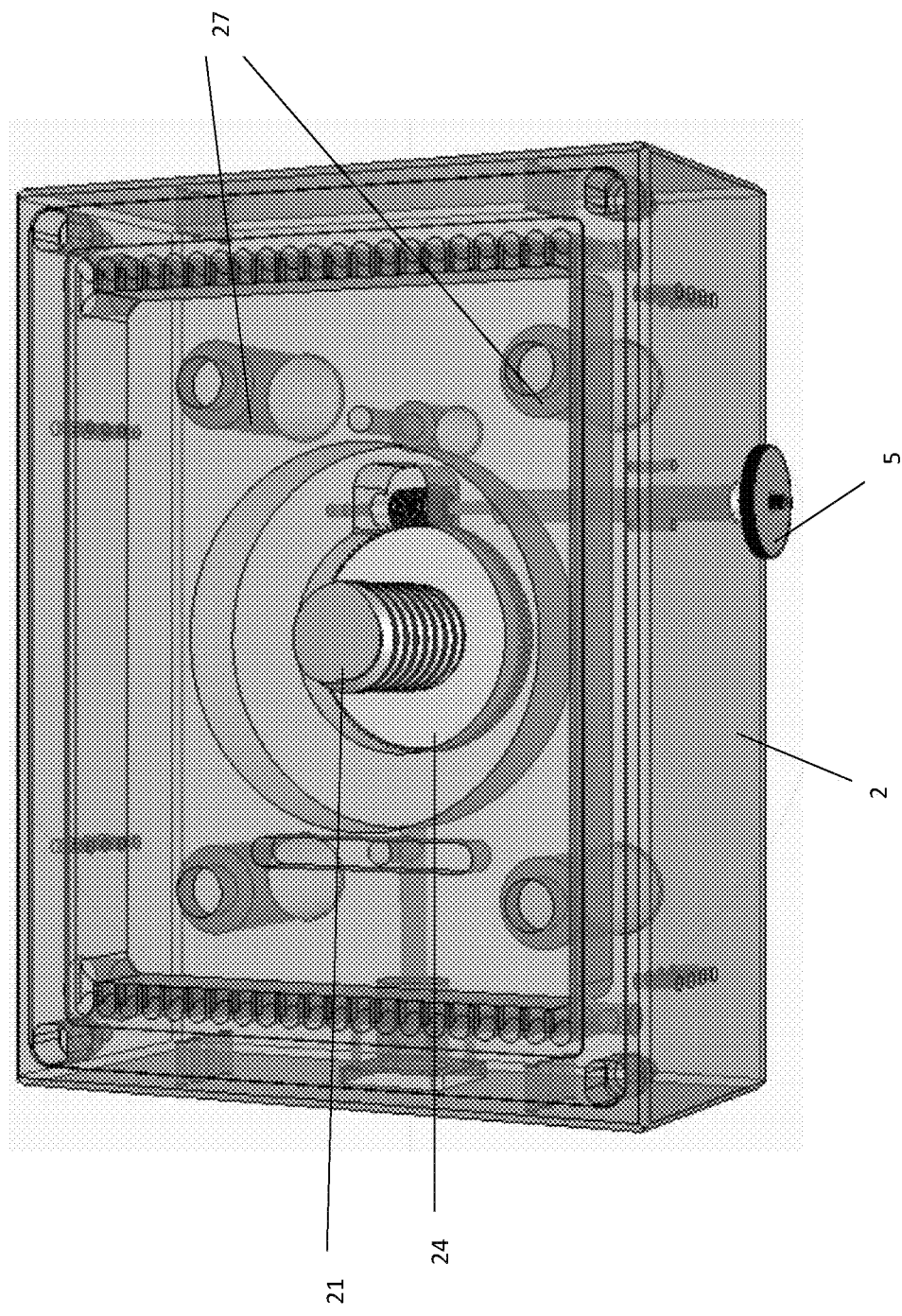
FIG. 6 shows a schematic perspective top view of a cell of the invention.

With reference to FIGS. 1(a) and 1(b) an apparatus assembly 1 is shown, which comprises a lower cell 2, and an upper cell 3, (constructed out of ultra high molecular weight polyethylene) coupled together by a series of toggle latches 4. On the lower cell 2, there is an external piston adjustment means 5 and a corresponding piston adjustment means 6 on the upper cell 3. An electrical connector 7 is shown on the upper cell 3. This electrical connector connects through to the anemometer within the cell that measures the cross-flow velocity of the fluids across the membrane when the apparatus is in use. A corresponding electrical connector would be provided on the lower cell, however, this is not shown in the figures provided. With reference to FIG. 1(b), fluid inlets and fluid outlets (8 and 9) are shown on the upper cell and fluid inlets and fluid outlets (10 and 11) are shown on the lower cell. With reference to FIGS. 2 and 3 the two cells of the apparatus assembly shown in FIGS. 1(a) and 1(b) have been separated by releasing the toggle latches. The top of each cell shows the respective membrane support surface. The lower cell 2, has polished stainless steel membrane support surface 12 and the upper cell 3, has the stainless steel membrane support surface 13. With reference to FIG. 3, a membrane 14 is shown as a piece of paper, which when the apparatus assembly would be sandwiched between the cells. With reference to FIG. 4, the membrane support surface 12 is shown, along with a plurality of inlet and outlet flow channels 15 and 16 positioned along opposing ends of membrane support surface 12. The inlet 15 and outlet 16 flow channels are in fluid communication with inlet 10 and outlet 11 on the external side of the cell 2. Also shown in FIG. 4 are the magnets 17 located in each corner of the cell housing. The magnets engage with complimentary located magnets on the other cell when the apparatus is assembled. These magnets assist in holding the cells together as well as maintaining the membrane in place when the membrane is sandwiched between the two cells. When the assembly is in use, the magnets are covered by a gasket 18 (shown in FIG. 2). The location of the anemometer 19 is shown on the top of the membrane support surface 12 and the anemometer 19 is what measures the cross flow velocity of a fluid flowing across the membrane support surface 12 when the apparatus is in use. With reference to FIG. 5, the internal features of the cell 2 are shown as well as the top of the piston 20 that is attached to the threaded piston member 21 by way of acme nut 22. The height of the piston 20, and therefore the membrane support surface 12 is adjusted by rotating the worm screw 23, by rotating the external mechanism 5 (see FIG. 1(a), which in turn rotates the gear wheel 24 and which in turn rotates the threaded piston member 21, which in turn pushes or pulls the acme nut 22, which pushes or pulls the piston 20 to adjust the height of the piston and thereby the membrane support surface 12. It is preferred that the gear wheel 24 is a scissor gear that eliminates any back lash. Similarly, there are four bolts 25 that are threadedly engaged with the piston at points 26. With reference to FIG. 6, the bolts 25 are biased through a helical spring (not shown) to maximise tension between the piston and the cell as a further means to minimise backlash or movement between the cell housing and the piston. Shaft 28 is used as a visual guide (tell-tale indicator), to guide the user as to the height of the piston 20 within the assembly, when in use. With reference to FIG. 1(a), the shaft 28 is exposed externally of the cell 3 and the shaft 28 goes up and down relative to the height of the piston or the membrane support surface 12. With reference to FIG. 6, the housing 27 of the threaded members 25 and their respective helical springs is shown.

Example 1

Flux Experiment

Figure 7:
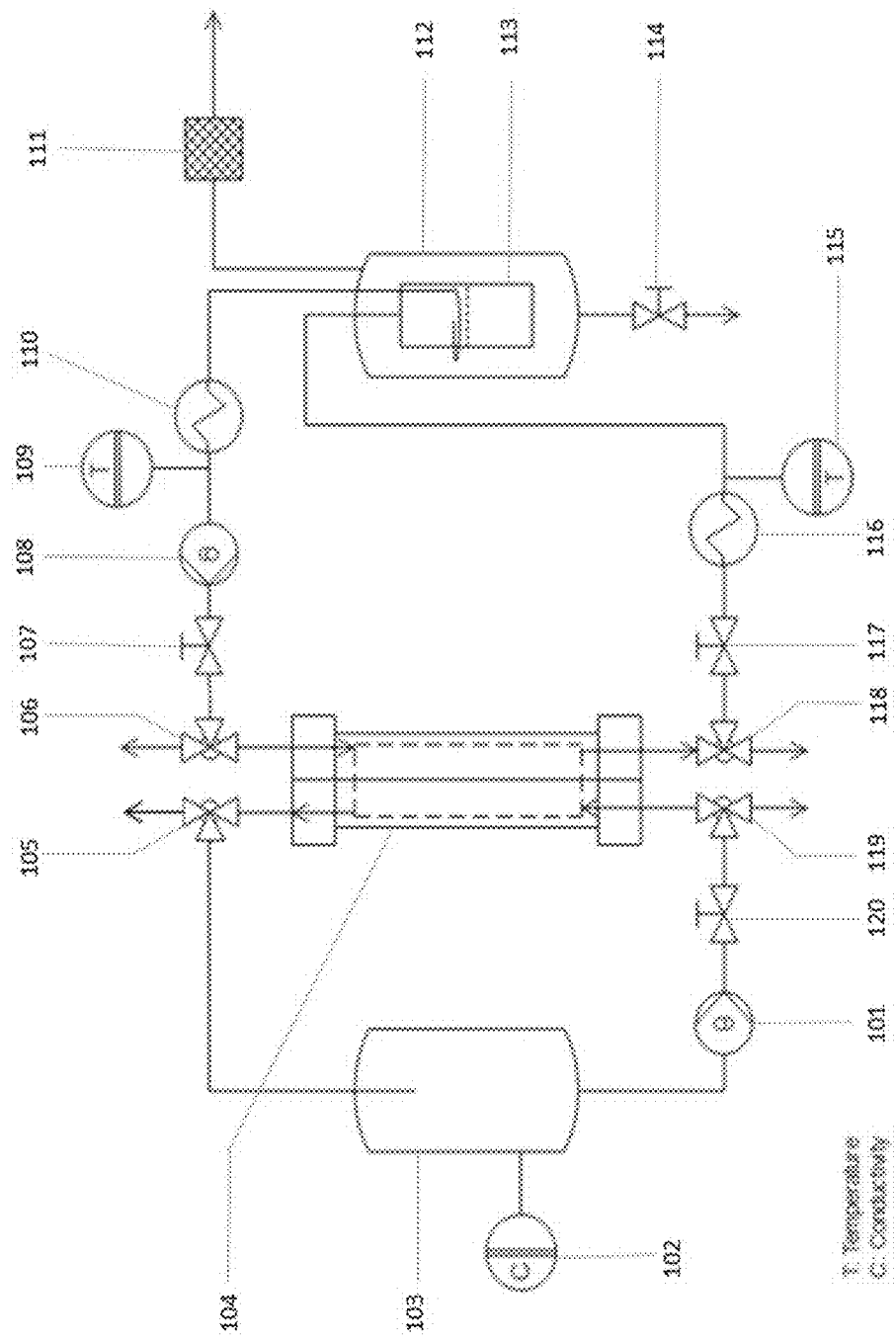
FIG. 7 shows schematically a flux experiment setup described below in Example 1.

The flux of water across a semipermeable membrane using various draw solutions (as detailed in Table 1) have been studied using a test system as illustrated in FIG. 7. The test system comprises a feed solution pump (101) that is used to circulate the feed from the feed tank (103) into the apparatus of the present invention, the membrane cell (104). A conductivity probe (102) is used to measure the conductivity in the feed tank (103). Three way valve (105) on the feed side of the membrane cell (104) and three way valve (6) on the draw side of the membrane cell (104) are used to isolate the membrane cell when cleaning or replacing the membrane. Another valve (107) is used to isolate the draw side when maintenance is required. This valve (107) can also be used when cleaning or replacing the membrane. A gear pump (108) on the draw side is used to circulate the draw solution into the membrane cell. A resistance temperature detector (109) is used to control the temperature after the chiller (110), which is a heat exchange used to cool the draw solution before entering the membrane cell (104). A filter (111) is shown that allows the flux experiment to be run at atmospheric pressure without exposing the operator to vapors or fumes. A coalescer cartridge/draw tank (112) is used to collect the draw solution and water after the membrane cell (4). The draw tank (112) and coaleser (113) are used for separation of the draw solution from water. At the bottom of the draw tank (112) and coalescer (113) is a valve (114) that is used to drain the tank/coalesce (112). A resistance temperature detector (115) is used to control the temperature after the heater (116), which is a heat exchanger used to heat the draw solution before being returned to the draw tank and coalesce (113). Two way valve (117) is used to isolate the draw side when cleaning or replacing the membrane. Three way valve (118) on the draw side of the membrane cell (104) and three way valve (119) on the draw side of the membrane cell (104) are used to isolate the membrane cell when cleaning or replacing the membrane. Two way valve (120) is used to isolate the feed side when cleaning or replacing the membrane. The test system was flushed with deionised water (in triplicate) on each side of the semipermeable membrane in the membrane cell (104). The semipermeable membrane was a forward osmosis membrane. The feed side of the membrane cell was filled with deionised water and the draw side of the membrane cell was filled with the selected draw solution being tested. The feed solution pump (101) and draw solution pump (108) were then turned on simultaneously and the test system was left to equilibrate for 2-3 minutes. The water level in the draw tank (113) was recorded and then the system was allowed to operate for 10 minutes. The draw tank (113) was then emptied by removing the water down to the originally noted level in the draw tank and the water was weighed to determine the quantity of water that crossed that membrane in 10 minutes. These last two steps were repeated for the duration of the test. The ratios, draw concentrations and duration of the tests conducted are tabulated below in Table 1.

TABLE 1

Figure 8:
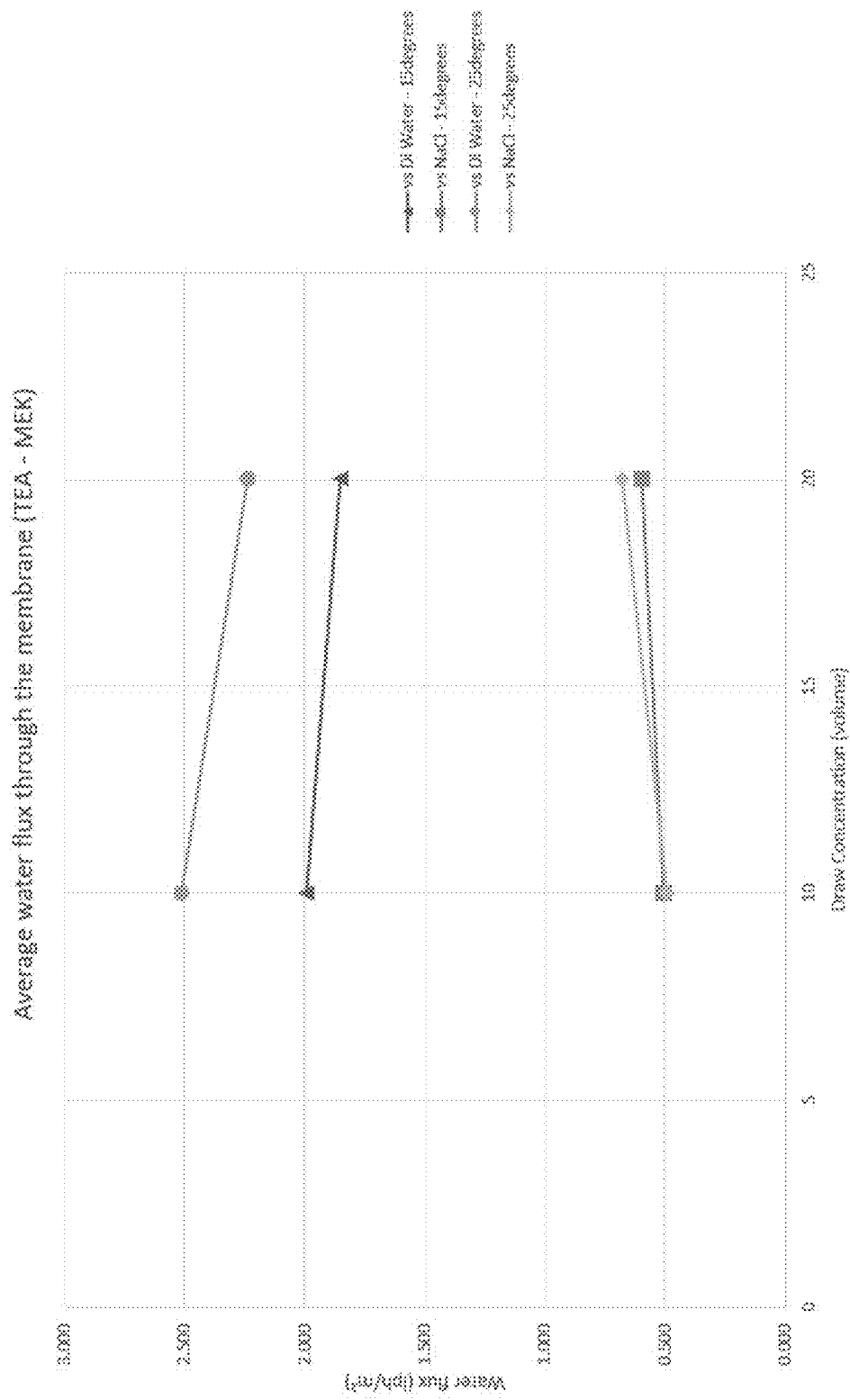
FIG. 8 shows a plot of the average water flux through a membrane involving a TEA-MEK draw solution.
Figure 9:
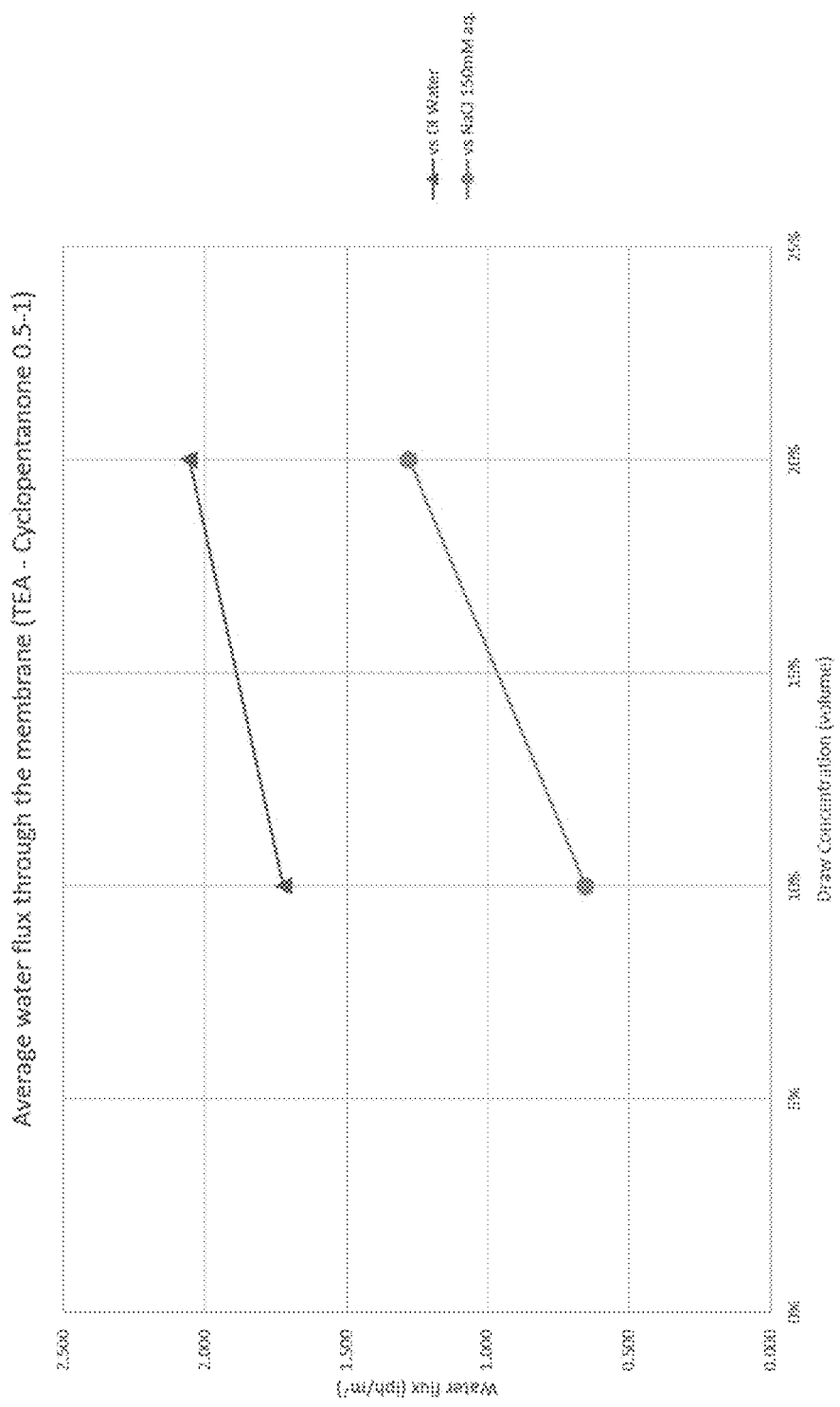
FIG. 9 shows a plot of the average water flux through a membrane involving a TEA-cyclopentanone draw solution.

| Draw | Feed | Ratio (amine-ketone) | Draw Conc | Duration | Sampling frequency | Average flux (l/h/m$^2$) |
|---|---|---|---|---|---|---|
| TEA-MEK | Deionised Water 150 mM NaCl aq. | 0.5-1.0 | 10 and 20% | 1 h 40 min | 10 minutes | See FIG. 7 See FIG. 7 |
| TEA-CP* | Deionised Water 150 mM NaCl aq. | 0.5-1.0 | 10 and 20% | 1 h 40 min | 10 minutes | See FIG. 8 See FIG. 8 |
| TEA-CP* | Deionised Water | 0.5-1.0 | 5% | 1 h | 10 minutes | 1.63 |
| TEA-MEK | Deinonised water | 1.0:1.0 | 100% | 1 h 40 min | 10 minutes | 3.733 |

*CP = cyclopentanone

It can be seen from Table 1 and FIGS. 7 and 8 that the average water flux was affected by temperature and draw solution concentration. The highest water flux rate was seen with a 1.0:1.0 ratio of TEA to MEK. In the case of TEA and MEK, as the temperature increased so did the water flux. As the draw solution concentration doubled the water flux dropped slightly. In contrast with the TEA cyclopentanone draw solution, the water flux increased when the draw solution concentration doubled.

It is to be appreciated that an apparatus assembly of the present invention could be included in a circuit including a mass balance, which is connected to a pump, which is connected to an in-line chiller, which in-line chiller is connected to an in-line heater, and which inline heater is then connected to the apparatus assembly and which apparatus assembly is further connected to the mass balance. Such a circuit would be one embodiment of a set up that could be used to assess the performance of a membrane. It is envisaged that such a circuit would be useful for determining the osmotic potential of a given membrane and would allow comparative studies to be performed with different membranes while being able to control and maintain certain parameters during the study of each membrane.

It is to be appreciated that various sensors can be set up within the cell to inform a user of the performance and parameters of the use of a given membrane. These sensors can include, but are not limited to pressure sensors, temperature sensors. It is to be appreciated that while the effectiveness of various membranes can be tested and trialed in the apparatus of the invention, the influence and effect of spacers on the membrane and fluid dynamics can be measured and also analysed. Data and analytics around the likes of pressure drops, temperature differentials, cross-flow velocities, mass flow, flux rates and the like are very instructive in optimising membrane conditions and optimising process conditions, such as for example an osmotic process.

The present invention and its embodiments have been described in detail. However, the scope of the present invention is not intended to be limited to the particular embodiments of any apparatus, process, manufacture, means, methods, and/or steps described in the specification. Various modifications, substitutions, and variations can be made to the disclosed material without departing from the spirit and/or essential characteristics of the present invention.

Accordingly, one of ordinary skill in the art will readily appreciate from the disclosure that later modifications, substitutions, and/or variations performing substantially the same function or achieving substantially the same result as embodiments described herein may be utilised according to such related embodiments of the present invention. Thus, the invention is intended to encompass, within its scope, the modifications, substitutions, and variations to any apparatus, processes, manufactures, compositions of matter, means, methods, and/or steps disclosed herein.

The invention claimed is:

1. A cell suitable for use in membrane assessment, the apparatus comprising:
   a) a housing that provides a base supporting an adjustable piston system,
   b) a membrane support surface, wherein the piston system, in use being able to adjust the height of the membrane support surface relative to the base plate of the housing,
   c) a membrane being locatable on the membrane support surface, and
   d) a constant temperature anemometer being located on the membrane support surface, which in use measures the cross-flow velocity of a fluid flowing on one side of the membrane, and
   e) one or more laminar input flow channels that in use direct a fluid across one side of the membrane and
   f) one or more laminar output flow channels that in use collect the fluid that has passed across the membrane.

2. The cell as claimed in claim 1, wherein the piston system is biased towards the base of the housing by one or more threaded members comprising a coil spring that bias the membrane support surface toward the housing base.

3. The cell as claimed in claim 1, wherein the membrane is locatable on the membrane support between one or more magnets.

4. The cell as claimed in claim 1, wherein the piston system is adjustable in increments of 1 or more microns.

5. The cell as claimed in claim 1, wherein there are a plurality of laminar input and output channels located along opposing ends of the cell.

6. The cell as claimed in claim 1, wherein, in use, the height adjustment of the piston system is achieved by turning a worm screw, that engages with and turns a worm gear, which worm gear rotates a threaded member, which threaded member rotates a nut, which threaded member moves the membrane support surface and adjusts its height.

7. The cell as claimed in claim 6, wherein the worm gear is a scissor gear.

8. The cell as claimed in claim 1, wherein the membrane is locatable on the membrane support surface without requiring one or more membrane perforations.

9. The cell as claimed in claim 1, wherein the cell is suitable for use in an osmotic membrane assessment.

10. An apparatus assembly that comprises two cells as claimed in claim 1, coupled together and separated by one membrane, wherein in use, one cell is dedicated to a first fluid on one side of the membrane and the other cell is dedicated to a second fluid on the other side of the membrane.

11. The apparatus assembly as claimed in claim 10, wherein the two cells are coupled together by one or more toggle latch catches that have a holding force greater than 10 kilograms.

12. The apparatus assembly as claimed in claim 11, suitable for use in an osmotic membrane assessment.

13. The apparatus assembly as claimed claim 12, which further comprises an external shaft that in use shows the height of the piston within the assembly.

14. The apparatus assembly as claimed in claim 13, wherein the laminar input and output flow channels are connectable to externally located fluid inlet and outlet reservoirs.

15. An apparatus kit that comprises:
a) an apparatus assembly as in claim 10,
b) a mass balance,
c) a pump,
d) an inline chiller; and an
e) Inline heater,
wherein in use, the kit elements are connected in a circuit with the mass balance connected to the pump, the pump is connected to the inline chiller, which inline chiller is connected to the inline heater, which inline heater is connected to the apparatus assembly and which apparatus assembly is connected to the mass balance for use in assessing the performance of a membrane with the apparatus assembly.

16. The apparatus kit as claimed in claim 15, wherein the mass balance in the kit is an enclosed mass balance that prevents volatile compounds being released into the atmosphere.

\* \* \* \* \*